Oct. 21, 1924.

J. G. ROWE 1,512,313

STORAGE BATTERY CONTAINER

Filed Dec. 28, 1923

Inventor
James G. Rowe
By Ritter & Ritter
his Attorneys

Patented Oct. 21, 1924.

1,512,313

UNITED STATES PATENT OFFICE.

JAMES G. ROWE, OF NIAGARA FALLS, NEW YORK, ASSIGNOR TO ANDREW A. MacLEAN, OF NIAGARA FALLS, NEW YORK.

STORAGE-BATTERY CONTAINER.

Application filed December 28, 1923. Serial No. 683,220.

*To all whom it may concern:*

Be it known that I, JAMES G. ROWE, a citizen of the United States, residing at Niagara Falls, in the county of Niagara and State of New York, have invented certain new and useful Improvements in Storage-Battery Containers; and I do hereby declare the following to be a full, clear, and exact description of the invention, such as will enable others skilled in the art to which it appertains to make and use the same.

My invention relates to storage battery containers suitable for holding the acid electrolyte and lead elements of the battery. The principal object of the invention is to provide a container having good insulating properties and acid resisting qualities which may be manufactured at a reduced cost and which affords a durable structure for fulfilling the conditions of service to which storage battery containers are subjected when employed on automobiles.

Generally stated, the invention consists in constructing a storage battery container as a case lined with an asphaltic hydrocarbon composition, the lining being molded in situ in the form of compartments with bridges for supporting the lead elements of the battery, and the said case forming a reinforcing backing for sustaining the lining.

A further feature of the invention consists in producing such a storage battery container by placing in the reinforcing case in plastic condition a quantity of the insulating material sufficient to form the lining of the case and in thereafter pressing said plastic material to cause it to form a lining which is supportingly backed by said case.

Other features of invention pertaining to especially advantageous details of construction will hereinafter appear and be particularly pointed out in the claims.

In the drawings illustrating a preferred embodiment of the invention,—

Figure 1:
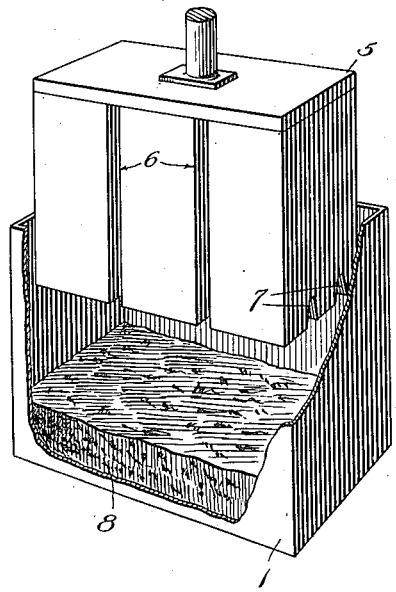
Figure 1 is a perspective view, parts being broken away, illustrating the preferred method of producing the battery containers by the use of a plunger for molding the insulating lining compound within an external metal case.
Figure 2:
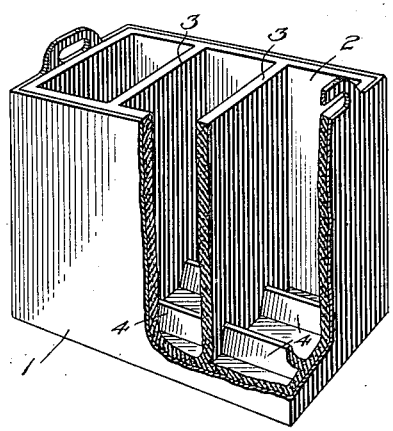
Figure 2 is a perspective view, parts being broken away, showing the finished container.

In the present application of storage batteries to the automotive field two types of construction are generally employed: first, a construction using a wooden battery box or case containing three hard rubber jars holding the lead elements, the jars being retained in position by a sealing compound poured into the case; and second, a molded hard rubber case containing three hard rubber jars molded as a unit. By my invention a large saving is effected in the cost of storage battery containers and the resulting structure is entirely practical and highly efficient.

In the drawings, 1 indicates the reinforcing case and 2 is the lining of the container. The ends and side walls of the case, whose size is governed by the number of compartments with which the container is provided, are preferably of a height equal to that of the adjacent portions of the internal insulating lining 2, so as to offer an extended support or backing for reinforcing said lining. The case 1 is preferably made of sheet iron or steel, as such materials afford excellent backing for the lining 2 without undue loss of space, but such materials as paper, wood fibre, concrete, magnesite composition or the like, may be employed for the case 1. The lining 2, which is of insulating and acid resisting material, is molded in situ within the case 1 so as to provide partitions 3 dividing the container into the desired number of compartments for receiving the lead elements of the battery. The insulating material is also preferably molded so as to provide each compartment with bridges 4 for supporting the lead elements. In the practice of the invention I employ for the lining 2 an asphaltic hydrocarbon composition of high melting point. This is melted in a suitable container by the application of heat and a sufficient quantity of it is poured into the case 1. While the insulating material is in a plastic condition a plunger 5 having slots 6 and grooves 7 of forms respectively corresponding to the partitions 3 and bridges 4 of the container, is forced downwardly in the case, thus causing the bulk of insulating material 8 to be pressed against the case and conform intimately thereto and to the said plunger, thereby giving to the lining the desired configuration completing the battery container. When the insulating material has cooled the plunger 5 is withdrawn. The plunger, which conveniently may be made of wood, stone or metal, may be dressed with talc, grease, castor oil, fish oil or any non-drying oil to prevent adherence of the asphaltic hydrocarbon molding compound. The phrase "molded in situ" used in the claims has reference to the operation of introducing the plastic substance into the container case and thereafter forcing said substance up the sides of the case by inserting a molding plunger within the case, or the equivalent of such an operation.

The asphaltic hydrocarbon composition may if desired contain tar pitches, Montan wax or both, and preferably is thoroughly mixed with approximately fifty per cent of suitable filler material such as asbestos fibre, silica sand, sulphur, talc, wool fibre, steel wool or other material which will interlock with the adhesive material so as to prevent cracking and pulling apart of the resultant product.

While it is preferred to mold the lining of the container by means of a plunger 5 forced into the case 1, the said plunger may be employed as a stationary mold properly positioned in the said case so as to impart to the insulating lining 2 the desired form when the hot asphaltic hydrocarbon composition is poured into the case and allowed to cool around the mold 5.

While I have set forth in detail the specific construction, materials and operations preferably employed, it will be appreciated that certain features of my invention are not confined to the specific materials, ingredients or method of molding described; and I regard as embodying my invention such changes or modifications as are within the scope of the invention as defined by the appended claims.

I claim:—

1. A storage battery container having at least one compartment and comprising a case lined with an asphaltic hydrocarbon composition molded in situ, said case forming a reinforcing backing for said lining.

2. A storage battery container having at least one compartment and comprising a metal case having bottom, side and end walls lined with an asphaltic hydrocarbon composition molded in situ, said bottom, side and end walls forming supporting reinforcements for corresponding parts of said lining.

3. A storage battery container having at least one compartment and comprising a case having side and end walls lined with an asphaltic hydrocarbon composition molded in situ, said side and end walls forming supporting reinforcements for corresponding parts of said lining.

4. A storage battery container having at least one compartment and comprising an internal lining formed of an asphaltic hydrocarbon composition, and a reinforcing portion forming a band encompassing said lining, said lining being molded in situ within said reinforcing band.

5. A storage battery container comprising a case, and a lining formed of an asphaltic hydrocarbon composition molded in situ and providing at least one compartment furnished with bridges adapted to support the lead elements of the battery.

6. A storage battery container comprising a case, and a lining of insulating material molded in situ.

7. A storage battery container having at least one compartment and comprising a lining of insulating material associated with means constituting a reinforcing backing for supporting said lining, said lining being molded in situ in assembled relation to said reinforcing means.

8. A storage battery container having at least one compartment and comprising reinforcing means and an internal insulating lining for said means, said lining being formed of an asphaltic hydrocarbon binder and a filler and being molded in situ within said reinforcing means.

9. A storage battery container having at least one compartment and comprising a case associated with and forming a reinforcing backing for a lining molded in situ within said case, said lining being formed of an asphaltic hydrocarbon binder and filler material involving silica sand.

10. The method of manufacturing a storage battery container having at least one compartment and comprising a case lined with an insulating material containing an asphaltic hydrocarbon, which involves placing the insulating material in said case in a plastic condition and subsequently inserting a molding plunger into said case and thereby pressing said plastic material within said case to cause it to form a lining supported by said case.

In testimony whereof I affix my signature.

JAMES G. ROWE